(12) United States Patent
Gim et al.

(10) Patent No.: US 10,621,710 B2
(45) Date of Patent: Apr. 14, 2020

(54) DISPLAY DEVICE AND DISPLAY METHOD THEREFOR

(71) Applicant: SAMSUNG ELECTRONICS CO., LTD., Suwon-si (KR)

(72) Inventors: Gi-yeong Gim, Yongin-si (KR);
Seung-hoon Han, Seoul (KR);
Young-su Moon, Seoul (KR);
Tae-gyoung Ahn, Yongin-si (KR);
Woo-seok Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 49 days.

(21) Appl. No.: 16/077,375

(22) PCT Filed: Feb. 12, 2016

(86) PCT No.: PCT/KR2016/001437
§ 371 (c)(1),
(2) Date: Aug. 10, 2018

(87) PCT Pub. No.: WO2017/138672
PCT Pub. Date: Aug. 17, 2017

(65) Prior Publication Data
US 2019/0057493 A1    Feb. 21, 2019

(51) Int. Cl.
*G06T 5/50*    (2006.01)
*G06T 5/00*    (2006.01)
*G09G 5/10*    (2006.01)

(52) U.S. Cl.
CPC ............... *G06T 5/009* (2013.01); *G06T 5/50* (2013.01); *G09G 5/10* (2013.01);
(Continued)

(58) Field of Classification Search
None
See application file for complete search history.

(56) References Cited

U.S. PATENT DOCUMENTS

| 5,930,402 A | 6/1999 | Kim |
| 7,031,544 B2 | 4/2006 | Sumitomo et al. |

(Continued)

FOREIGN PATENT DOCUMENTS

| JP | 2002-300384 A | 10/2002 |
| JP | 2002-300459 A | 10/2002 |

(Continued)

OTHER PUBLICATIONS

Hunt, B., "The Application of Constrained Least Squares Estimation to Image Restoration by Digital Computer", Sep. 1973, IEEE Transactions on Computers vol. C-22, Issue No. 9, pp. 805-812.

(Continued)

*Primary Examiner* — Peter Hoang
(74) *Attorney, Agent, or Firm* — Sughrue Mion, PLLC

(57) ABSTRACT

A display apparatus is provided. The display apparatus according to an exemplary embodiment includes a display, and a processor configured to generate a second image and a third image where a dynamic range is expanded by respectively applying a first gain and a second gain to an input first image, generate a degraded image of the second image by applying a predetermined degradation model to the second image, based on a difference value between a pixel of the degraded second image and a pixel of the third image satisfying a predetermined condition, modify a pixel value of the second image based on the difference value, and output the second image where the pixel value is modified through the display.

15 Claims, 17 Drawing Sheets

(52) U.S. Cl.
CPC ............... *G06T 2207/20021* (2013.01); *G06T 2207/20208* (2013.01); *G09G 2320/0271* (2013.01); *G09G 2320/0276* (2013.01); *G09G 2320/066* (2013.01); *G09G 2340/0428* (2013.01); *G09G 2360/16* (2013.01)

(56) References Cited

U.S. PATENT DOCUMENTS

| | | | |
|---|---|---|---|
| 7,054,502 | B2 | 5/2006 | Nakano et al. |
| 7,221,408 | B2 | 5/2007 | Kim |
| 7,940,997 | B2 | 5/2011 | Han et al. |
| 8,035,663 | B2 | 10/2011 | Ishii et al. |
| 8,044,978 | B2 | 10/2011 | Na |
| 8,295,539 | B2 | 10/2012 | Kaida et al. |
| 8,411,987 | B2 | 4/2013 | Han et al. |
| 8,472,748 | B2 | 6/2013 | Jang et al. |
| 8,610,738 | B2 | 12/2013 | Choe et al. |
| 2002/0167597 | A1 | 11/2002 | Nakano et al. |
| 2002/0168115 | A1 | 11/2002 | Sumitomo et al. |
| 2007/0104387 | A1 | 5/2007 | Han et al. |
| 2008/0012964 | A1 | 1/2008 | Miki et al. |
| 2008/0037866 | A1 | 2/2008 | Na |
| 2008/0291224 | A1 | 11/2008 | Ishii et al. |
| 2008/0310752 | A1 | 12/2008 | Han et al. |
| 2009/0147986 | A1 | 6/2009 | Kaida et al. |
| 2010/0164976 | A1 | 7/2010 | Choe et al. |
| 2012/0038800 | A1 | 2/2012 | Jang et al. |
| 2014/0168192 | A1* | 6/2014 | Jeong .................. G09G 3/3208 345/212 |
| 2014/0210847 | A1 | 7/2014 | Knibbeler et al. |
| 2014/0225941 | A1 | 8/2014 | Van Der Vleuten et al. |
| 2015/0279324 | A1* | 10/2015 | Ohta .................. G09G 3/3283 345/690 |
| 2016/0012572 | A1 | 1/2016 | Min et al. |
| 2016/0350899 | A1* | 12/2016 | Suzuki .................. G06T 5/009 |

FOREIGN PATENT DOCUMENTS

| | | |
|---|---|---|
| JP | 2008-21271 A | 1/2008 |
| JP | 2008-292649 A | 12/2008 |
| KR | 10-2005-0058947 A | 6/2005 |
| KR | 10-0609892 B1 | 8/2006 |
| KR | 10-2010-0076455 A | 7/2010 |
| KR | 10-2012-0016475 A | 2/2012 |
| KR | 10-1128454 B1 | 3/2012 |
| KR | 10-1248872 B1 | 3/2013 |
| KR | 10-1303665 B1 | 9/2013 |
| KR | 10-1329136 B1 | 11/2013 |
| KR | 10-2014-0066771 A | 6/2014 |
| KR | 10-2016-0007319 A | 1/2016 |

OTHER PUBLICATIONS

Kang, et al., "General Choice of the Regularization Functional in Regularized Image Restoration", May 1995, IEEE Transactions on Image Processing, vol. 4, Issue No. 5, pp. 594-602.

International Search Report dated Dec. 1, 2016, issued by the International Searching Authority in counterpart International Application No. PCT/KR2016/001437 (PCT/ISA/210).

Written Opinion dated Dec. 1, 2016, issued by the International Searching Authority in counterpart International Application No. PCT/KR2016/001437 (PCT/ISA/237).

* cited by examiner

Inverse sigmoid

Lower gamma

Upper gamma y'

Hx

ε

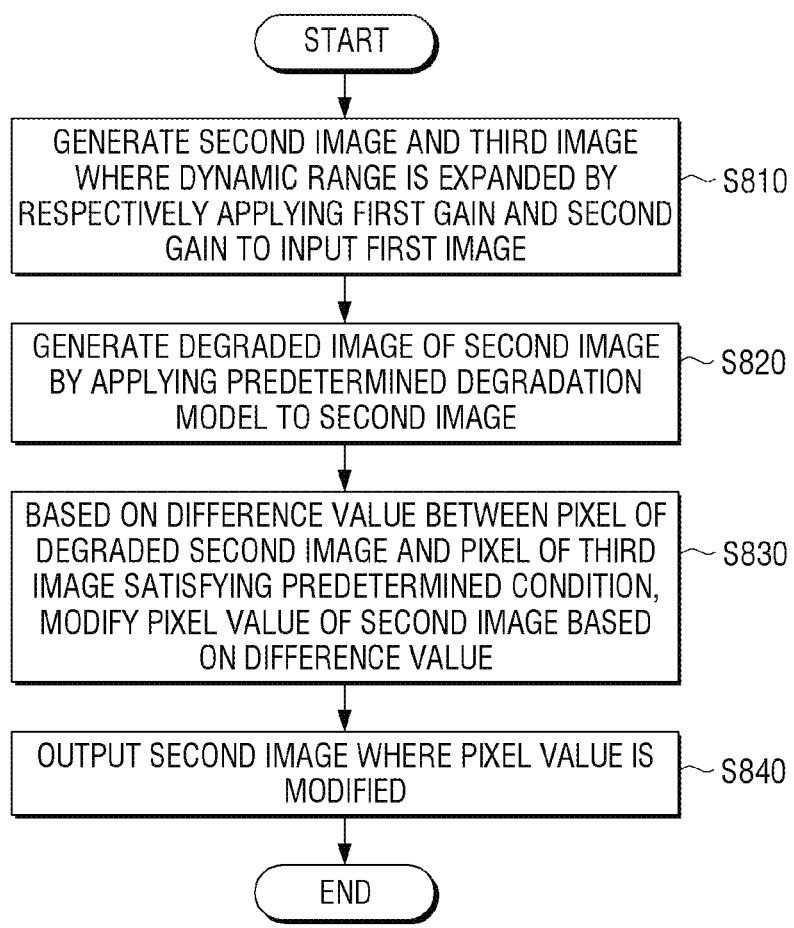

DISPLAY DEVICE AND DISPLAY METHOD THEREFOR

FIELD OF THE INVENTION

Devices and methods consistent with what is disclosed herein relate to a display apparatus and a display method thereof, and more particularly, to a display apparatus for displaying an input image and a display method thereof.

DESCRIPTION OF THE RELATED ART

A Contrast Enhancement (CE) technology is a technique for enhancing the contrast of an image by expanding a dynamic range of an input image. Particularly, a technology of dividing and processing an image to improve the local contrast in an image is referred to as Local Contrast Enhancement (LCE) technology. Typically, the local contrast enhancement technology divides an image into a plurality of blocks, analyzes average luminance and improve the contrast on a block-by-block basis based on the analysis result.

However, the contrast enhancement technologies using the conventional transfer function fail to fill the lower bits although the number of output bits is greater than the number of input bits, which makes it impossible to fully utilize the increased number of output bits since an input is mapped to an output in one-to-one correspondence based on the transfer function.

Accordingly, by analyzing a histogram of input versus output, the range of the histogram may be broadened and therefore, the contrast may be enhanced. However, there is a problem that the detail may be damaged due to the clustering at low grayscale and high grayscale levels or contour may occur in a grayscale where a dynamic range is expanded.

Such a problem raises when an image having a relatively small number of bits is output from a display apparatus where the number of output bits is increased.

Therefore, it is required to solve the problem of grayscale clustering and contour occurrence, which arise although the contrast is enhanced.

DETAILED DESCRIPTION

Technical Problem

An aspect of the exemplary embodiments relates to a display apparatus for expanding a dynamic range of an input image and outputting the image and a display method thereof.

Solution to Problem

According to an exemplary embodiment, there is provided a display apparatus including a display, and a processor configured to generate a second image and a third image where a dynamic range is expanded by respectively applying a first gain and a second gain to an input first image, generate a degraded image of the second image by applying a predetermined degradation model to the second image, based on a difference value between a pixel of the degraded second image and a pixel of the third image satisfying a predetermined condition, modify a pixel value of the second image based on the difference value, and output the second image where the pixel value is modified through the display.

According to an exemplary embodiment, there is provided a display method of a display apparatus, the method including generating a second image and a third image where a dynamic range is expanded by respectively applying a first gain and a second gain to an input first image, generating a degraded image of the second image by applying a predetermined degradation model to the second image, based on a difference value between a pixel of the degraded second image and a pixel of the third image satisfying a predetermined condition, modifying a pixel value of the second image based on the difference value, and outputting the second image where the pixel value is modified.

Effect of the Invention

As described above, according to various embodiments of the present disclosure, although a dynamic range of an input image is expanded, an image where grayscale clustering or contour occurrence is minimized could be output.

BRIEF DESCRIPTION OF THE DRAWINGS

FIG. 8 is a flowchart to explain a display method of a display apparatus according to an embodiment of the present disclosure.

DETAILED DESCRIPTION OF EXEMPLARY EMBODIMENTS

Figure 1A:
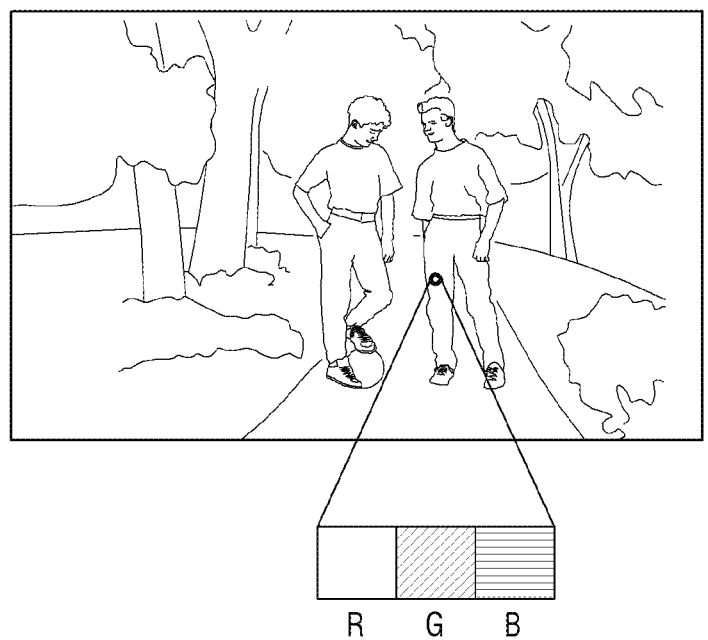
FIGS. 1A and 1B are views to explain the number of bits for facilitating understanding of the present disclosure.

Hereinafter, various embodiments of the present disclosure will be described with reference to the accompanying drawings. It is to be understood that the disclosure herein is not intended to limit the scope of the invention to the specific embodiments but includes various modifications, equivalents, and/or alternatives of the embodiments. In the description of the drawings, like reference numerals refer to like elements throughout the description of drawings.

When an element (e.g., a first constituent element) is referred to as being "operatively or communicatively coupled to" or "connected to" another element (e.g., a second constituent element), it should be understood that each constituent element is directly connected or indirectly connected via another constituent element (e.g., a third constituent element). However, when an element (e.g., a first constituent element) is referred to as being "directly coupled to" or "directly connected to" another element (e.g., a second constituent element), it should be understood that there is no other constituent element (e.g., a third constituent element) interposed therebetween.

The terminology used herein is for the purpose of describing particular embodiments and is not intended to be limiting the scope of other example embodiments. As used herein, the singular forms are used for convenience of explanation, but are intended to include the plural forms as well, unless the context clearly indicates otherwise. In addition, terms used in this specification may have the same meaning as commonly understood by those skilled in the art. General predefined terms used herein may be interpreted as having the same or similar meaning as the contextual meanings of the related art, and unless expressly defined herein, the terms are not to be construed as an ideal or overly formal sense. In some cases, the terms defined herein may not be construed to exclude embodiments of the present disclosure.

Hereinafter, various embodiments of the present disclosure will be described in detail with reference to the accompanying drawings.

Figure 1B:
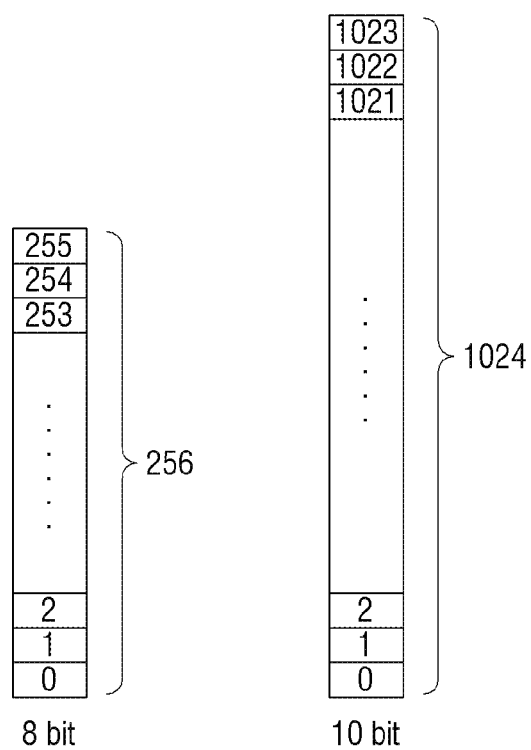

FIGS. 1A and 1B are views to explain the number of bits for facilitating understanding of the present disclosure.

Referring to FIG. 1A, each pixel of an image may have color data of R, G and B, and each color data may have the specific number of bits. For example, an image may consist of R, G and B data each having 8 bits in order to represent one pixel. In this case, a total of 24 bits may be needed for representing one pixel. In addition, in order to represent one frame of an image, the number of bits of 24 bits×resolution may be required.

The number of bits may refer to the degree of potential density of hardware or software for processing digital data. Typically, as the number of valid bits is increased, the data processing result may be more accurate, and the number of bits may be represented by a bit depth, etc. Hereinafter, the number of bits of each color data may be referred to as the number of bits of an image or the number of bits of a pixel.

FIG. 1B is a view to explain a difference in color representation according to the number of bits. For example, an 8-bit R color may represent a total of 256 levels of color. A 10-bit R color may represent a total of 1024 levels of color. Therefore, as the number of bits increases, the color may be accurately expressed.

The number of bits may refer to the number of bits of a pixel constituting an image, but could be the number of bits supported by a display apparatus. For example, the display apparatus may support an 8-bit image in hardware, and an image input into the display apparatus may be an image of 10 bits. In this case, the display apparatus may convert a 10-bit image into an 8-bit image for displaying. Therefore, when the number of bits of an image does not coincide with the number of bits of a display apparatus, distortion may occur when an image is displayed.

The distortion may occur when the maximum bit number supported by the display apparatus in hardware is greater than the bit number of an image input into the display apparatus. Hereinafter, a method for increasing the number of bits of an input image will be described in detail.

Figure 2A:
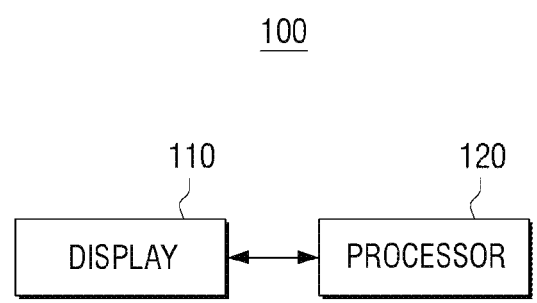
FIG. 2A is a block diagram illustrating configuration of a display apparatus according to an embodiment of the present disclosure.

FIG. 2A is a block diagram illustrating configuration of a display apparatus 100 according to an embodiment of the present disclosure.

The display apparatus 100 according to various embodiments of the present disclosure may include one or more of displays and execute an application or display contents. For example, the display apparatus 100 may be embodied as one of a digital television, a tablet, a personal computer (PC), a portable multimedia player (PMP), a personal digital assistant (PDA), a smart phone, a cellular phone, a digital frame, a digital signage, and a kiosk.

Referring to FIG. 2A, a display apparatus 100 may include a display 110 and a processor 120.

The display 110 may display various images under the control of the processor 120. The display 110 may display an image where a dynamic range of an input image is expanded. For example, when the display 110 outputs a 10-bit image and an input image has 8 bits, the display 110 may display an image where a dynamic range is expanded under the control of the processor 120.

The dynamic range may refer to a ratio from the lowest level to the highest level. For example, a 10-bit image may have a larger dynamic range than an 8-bit image. In other words, according to an example embodiment, the processor 120 may convert the 8-bit image into the 10-bit image to correspond to the display 110.

The display 110 may embodied as Liquid Crystal Display Panel (LCD), Organic Light Emitting Diodes (OLED), etc., but the present disclosure is not limited thereto. The display 110 may be embodied as a flexible display, a transparent display, etc. in some cases.

The processor 120 may control the overall operation of the display apparatus 100.

The processor 120 may generate a second image and a third image where a dynamic range is expanded by respectively applying a first gain and a second gain to an input first image. The processor 120 may generate a second image and a third image where a dynamic range is expanded by applying a first gain and a second gain to all pixels of the first image for each color data.

The processor 120 may generate a second image and a third image by setting a first gain and a second gain based on the number of output bits of the display apparatus 100 and the number of bits of the input first image, and by respectively applying the set first and second gains to the input first image. The number of output bits of the display apparatus 100 may refer to a hardware performance of the display apparatus 100.

The processor 120 may set a first gain and a second gain based on equation below.

$$\text{First gain} = \frac{2^k - 1}{2^n - 1}$$ [Equation 1]

$$\text{Second gain} = \frac{2^k}{2^n} = 2^{k-n}$$

Where k is the number of bits of the display apparatus 100 and n is the number of bits of the first image.

For example, when the number of bits of the display apparatus 100 is 10 bits, and the number of bits of the first image is 8 bits, the processor 120 may set a first gain to 1023/255 and a second gain to 4. However, the present disclosure is not limited thereto. The processor 120 may set the first gain and the second gain to any other value.

The processor 120 may generate a second image and a third image where a dynamic range is expanded by multiplying all pixels of the first image by the first gain and the second gain for each color data. The processor 120 may convert the first gain and the second gain to binary numbers and generate a second image and a third image. For example, the processor 120 may add lower 2 bits of color data bits of the first image when multiplying the pixels of the first image by the second gain.

Alternatively, the processor 120 may generate a second image and a third image by multiplying a value obtained by converting each color data of a pixel into a decimal number by a first gain and a second gain, rounding off to the nearest whole number, and then converting the number into a binary number. The processor 120 may use rounding up, rounding, rounding down and the like to round off to the nearest whole number, and various other methods could be used.

The second image and the third image generated according to the above-described method may be an image where a dynamic range is expanded, but the values of all levels within a dynamic range may not be used.

The processor 120 may generate a degraded image of the second image by applying a predetermined degradation model to the generated second image. The degradation model may be a function for degrading the contrast and could be at least one of an Inverse Sigmoid function, a Lower Gamma function and an Upper Gamma function. However, the present disclosure is not limited thereto, but any kind of function could be used. In addition, which function could be used as a degradation model may be determined based on the characteristic of an image.

The processor 120 may apply a degradation model based on the equation below.

$$y = Hx \qquad \text{[Equation 2]}$$
$$y \in \{0, 1, 2, \ldots, 2^n - 1\}$$
$$x \in \{0, 1, 2, \ldots, 2^k - 1\}, n \leq k)$$

Where H is a degradation model function, x is a pixel value included in a second image, and y is the value obtained by truncating the lower bits after the deterioration of x.

The second image generated as described above may be an image that does not use all level values within the dynamic range, and in the case of the second image, which is degraded by application of the degradation model, the number of level values used within the dynamic range may be increased. The detailed description of the degradation model will be described below.

The processor 120 may calculate a difference value between a pixel of the degraded second image and a pixel of the third image based on the equation below.

$$\varepsilon = y' - Hx \qquad \text{[Equation 3]}$$

Where $\varepsilon$ is a difference value between a pixel of the degraded second image and a pixel of the third image and y' is a pixel value of the third image.

The processor 120 may adjust the numbers of bits of y' and Hx to either one to calculate a difference value. For example, the processor 120 may calculate a difference value by filling random bits to equalize the numbers of bits of y' and Hx.

Based on a difference value satisfying a predetermined condition, the processor 120 may modify the second image by adding a difference value to the pixel value of the second image. The predetermined condition may be a case where a difference value is smaller than a predetermined threshold value.

Based on a difference value not satisfying a predetermined condition, the processor 120 may use the second image where the pixel value is modified as the first image and repeat the process.

While repeating the process, when the difference value is smaller than a predetermined threshold value or when the number of repetitions of the process is equal to or greater than a predetermined threshold number, or in both cases, the processor 120 may eventually output the second image where the pixel value is modified.

Based on a difference value not satisfying a predetermined condition, the processor 120 may modify a pixel value of the second image by applying a third gain to the difference value, and use the second image where the pixel value is modified as the first image to repeat the process. For example, the processor 120 may modify the second image by adding a value obtained by multiplying the difference value by the third gain to the pixel value of the second image. In this case, a predetermined condition will be satisfied more quickly.

The processor 120 may repeat the process described above only for pixels that do not satisfy the predetermined condition without repeating the above-described process for pixels satisfying the predetermined condition. For example, the processor 120 may repeat the process with respect to color data of the pixel that fails to satisfy the predetermined condition in the process of generating the second image, the third image, the degraded second image and the second image where the pixel value is modified. However, the present disclosure is not limited thereto. The processor 120 may repeat the process until a predetermined condition is satisfied with respect to the color data of all pixels.

The processor 120 may divide the first image into a predetermined plurality of areas and use each of the predetermined plurality of areas as the input first image to repeat the process. For example, the processor 120 may divide the first image into 16 screens of 4×4, repeat the process with respect to each divided area of the screen and generate the second image where the pixel value is modified.

In this case, a block boundary may be indicated at the modified image and the processor 120 may apply a de-blocking filter, etc. to the block boundary. However, the present disclosure is not limited thereto, but any type of filter could be used as long as it reduces the difference between blocks.

It is described that the second image and the third image are generated from the first image and the second image where a pixel value is modified is output eventually, but the present disclosure is not limited thereto.

For example, the processor 120 may perform the above described process in a pixel unit. For example, the processor 120 may not generate a second image and a third image, but may change the number of bits of the pixel value in the first area, apply a degradation model, calculate a difference value and calculate a modified pixel value.

Based on the difference value satisfying a predetermined condition, the processor 120 may store the modified pixel value and repeat the same process with respect to a subsequent pixel.

Based on the difference value not satisfying the predetermined condition, the processor 120 may calculate a difference value by applying a degradation model again using the modified pixel value and then calculate the modified pixel value.

The processor 120 may determine a degradation model based on the characteristic of an entire image or the characteristic of each block of an image. In other words, even when an image is processed in a pixel unit, the processor 120 may determine a degradation model in the same manner as the case of processing an image on an image basis.

The processor 120 may perform the process with respect to all pixels. The processor 120 may determine a degradation model according to the image characteristic of each area and apply a different degradation model to each area.

Figure 2B:
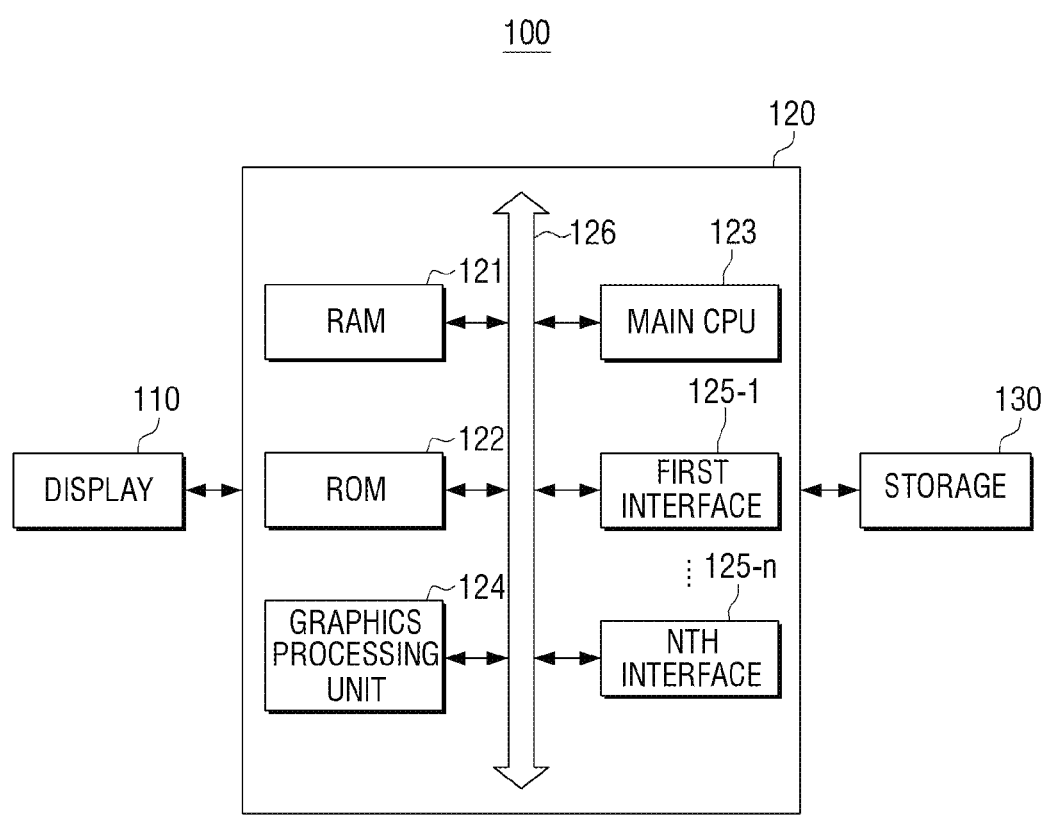
FIG. 2B is a block diagram illustrating detailed configuration of the display apparatus shown in FIG. 2A.

FIG. 2B is a block diagram illustrating detailed configuration of the display apparatus 100 shown in FIG. 2A. The detailed description of the configuration shown in FIG. 2B that is the same as the configuration shown in FIG. 2A will be omitted.

The processor 120 may include a RAM 121, a ROM 122, a main CPU 123, a graphics processing unit 124, first to n interfaces 125-1 to 125-*n*, and a bus 126.

The RAM 121, the ROM 122, the main CPU 123, the graphics processing unit 124, the first to n interfaces 125-1 to 125-*n*, and the like may be connected to one another via the bus 126.

The first to n interfaces 125-1 to 125-*n* may be connected to above described various constituent elements. One of the interfaces may be a network interface that is connected to an external device via a network.

The main CPU 123 may access a storage 130 and perform booting by using an operation system (O/S) stored in the storage 130. The main CPU 123 may perform various operations by using various programs, contents, data, etc. stored in the storage 130.

The ROM 122 may store a command set, etc. for system booting. When a turn on command is input and power is supplied, the main CPU 123 may copy the operation system (O/S) stored in the storage 130 to the RAM 121 according to the command stored in the ROM 122, execute the operation system (O/S) and perform system booting. When booting is completed, the main CPU 123 may copy the various programs stored in the storage 130 to the RAM 121, execute the program copied to the RAM 121 and perform various operations.

The graphics processing unit 124 may generate a screen including various objects such as icons, images, texts, etc. by using a calculation unit (not shown) and a rendering unit (not shown). The calculation unit (not shown) may calculate an attribute value such as a coordinate value, a shape, a size, a color, etc. of each object according to the layout of the screen according to the received control command. The rendering unit (not shown) may generate a screen of various layouts including objects based on the attribute values calculated by the calculation unit (not shown). For example, the graphics processing unit 124 may generate a UI screen for providing various guide information with respect to the environment condition. The operation of the processor 120 may be performed by a program stored in the storage 130.

As described above, the storage 130 may store various data such as an Operation System (O/S) software module, a dynamic range expansion module, an image analysis module for driving the display apparatus 100.

Figure 3:
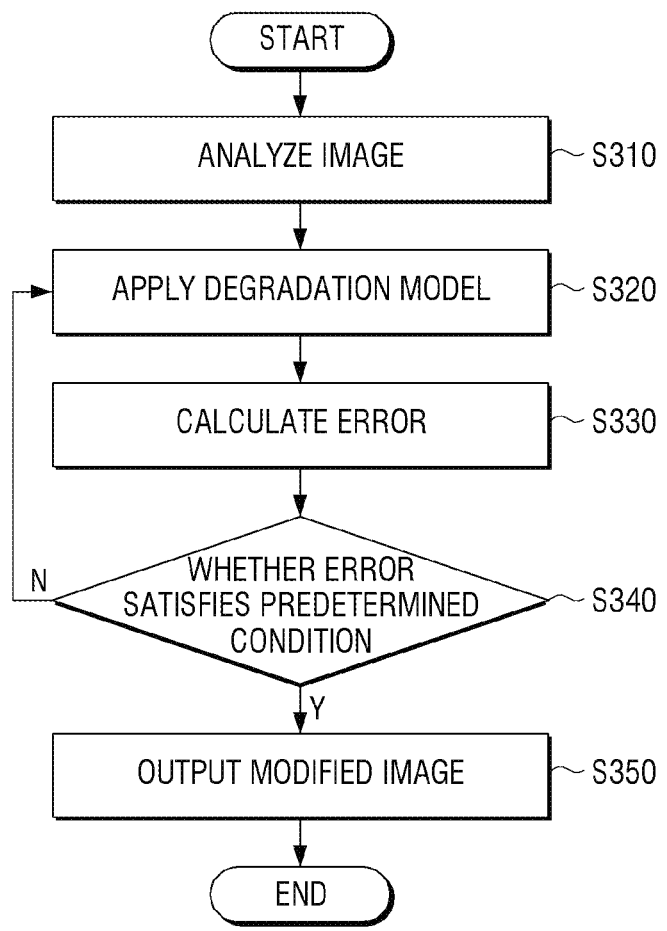
FIG. 3 is a flowchart to explain a method for expanding a dynamic range and enhancing contrast according to an embodiment of the present disclosure.

FIG. 3 is a flowchart to explain a method for expanding a dynamic range and enhancing a contrast according to an embodiment of the present disclosure.

The processor 120 may analyze an image at step S310. The processor 120 may analyze a full screen of an image or each area of an image by dividing a screen. The processor 120 may determine which degradation model to apply according to the analysis result. For example, the processor 120 may determine a degradation model by calculating at least one of average brightness and standard deviation of a full screen or a divided area.

When dividing a screen, the processor 120 may determine the size of the area to be divided in consideration of resolution of an input image. For example, the processor 120 may divide an image of high resolution to be smaller than an image of low resolution. When a screen is divided into very small ones, a dynamic range may be broadened by reflecting the local characteristic of an image, but Halo artifact may occur since the difference from surroundings increases. Accordingly, the processor 120 may determine the size of the area to be divided in consideration of not only the resolution but also the difference from the surroundings.

When image analysis is completed, the processor 120 may apply a degradation model to an image at step S320. The processor 120 may truncate the low bits of the image to degrade the number of bits.

Figure 4A:
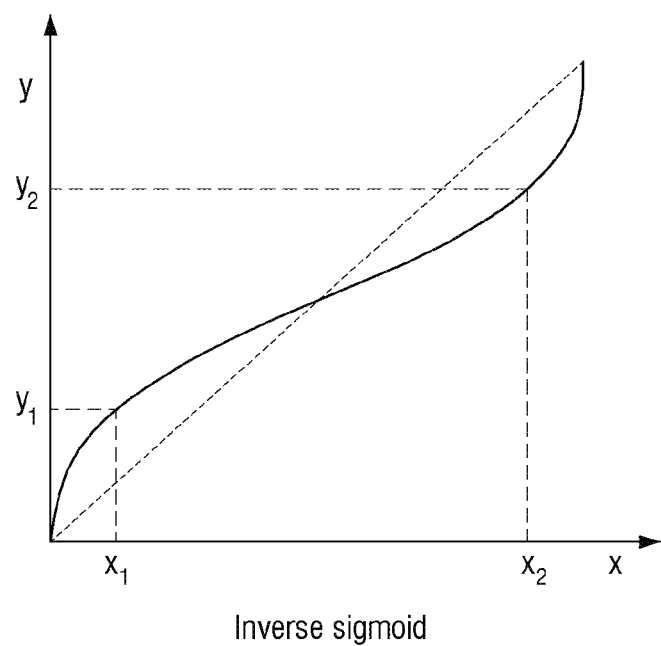
FIGS. 4A to 4D are views to explain an example embodiment of a degradation model.
Figure 4B:
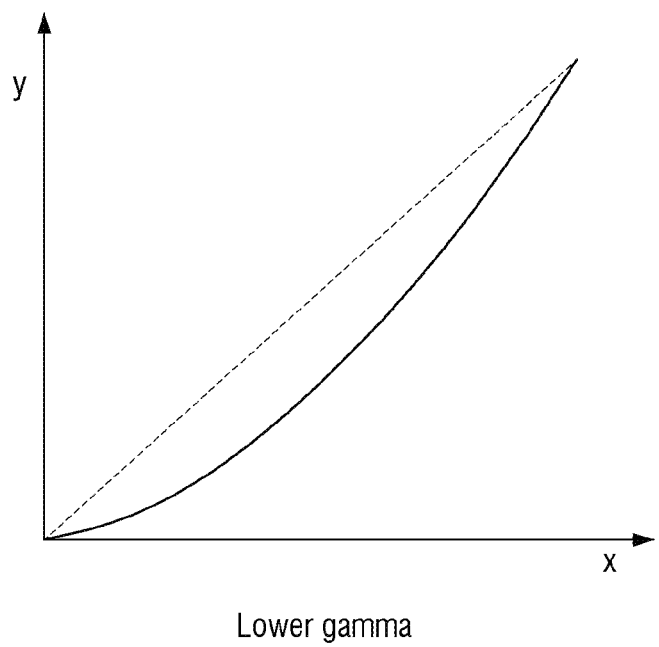
Figure 4C:
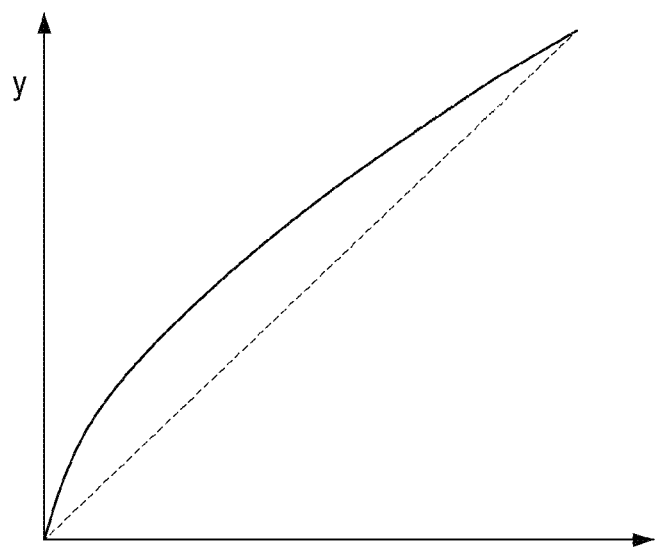

FIGS. 4A to 4C are views to explain an example embodiment of a degradation model. The degradation model may be at least one of an Inverse Sigmoid function, a Lower Gamma function and an Upper Gamma function, but the present disclosure is not limited thereto. The case of using the Lower Gamma function and the Upper Gamma function is similar to the case of using the Inverse Sigmoid function, so only the case of using the Inverse Sigmoid function will be described.

Figure 4D:
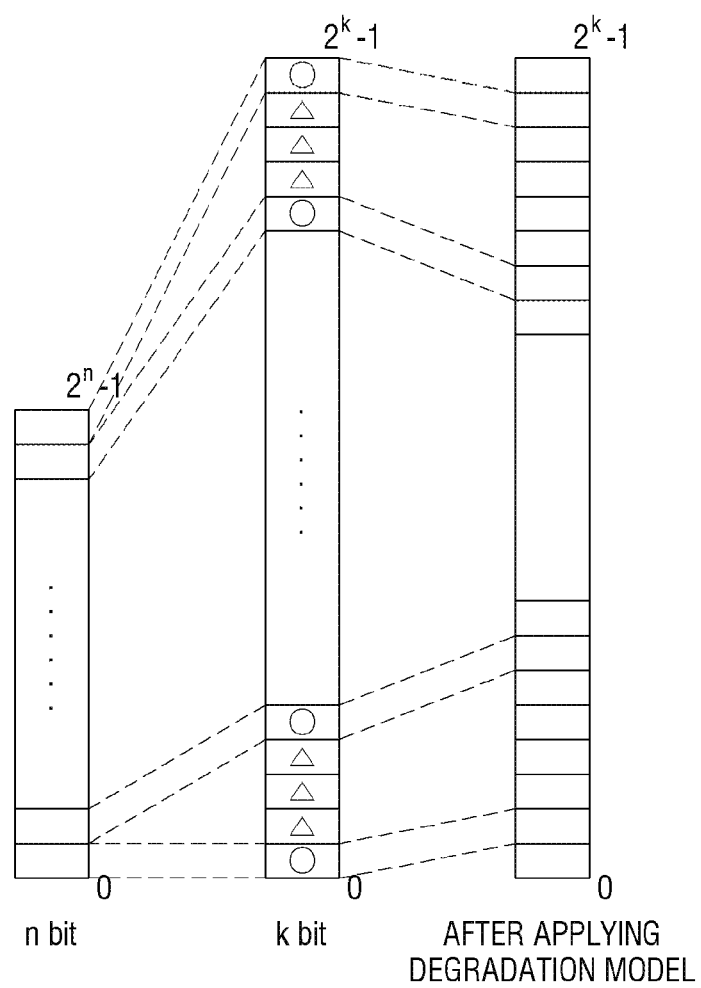

The x value of the inverse Sigmoid function may be a value obtained by expanding the dynamic range. The x value may be simply a value of the number of k bits generated by multiplying the number of n bits by a predetermined gain. Accordingly, as shown in FIG. 4D, the bit value marked by triangle may not be used even if the dynamic range is expanded.

When such an x value is input into the Inverse Sigmoid function of FIG. 4A, various bit values may be used due to the continuity of the function. In addition, using the Inverse Sigmoid function, a dark part (x1) may be changed a brighter part (y1) and a bright part (x2) may be changed to a darker part (y2). Therefore, as shown in FIG. 4C, when the Inverse Sigmoid function is used, the dynamic range may be reduced and the contrast may be degraded. In addition, a bit value that has not been used may be used.

However, as described above, since the degraded value is subtracted from the third image by the processor 120, the dynamic range may be expanded eventually. In general, the Inverse Sigmoid function may degrade the contrast at middle grayscale level, the Lower Gamma function may degrade the contrast at low grayscale level, and the Upper Gamma function may degrade the contrast at high grayscale level.

Figure 5A:
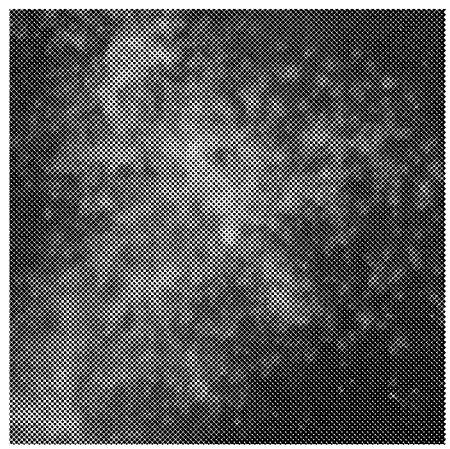
FIGS. 5A to 5C are views illustrating an input image, a degraded image and a difference therebetween (an error)
Figure 5B:
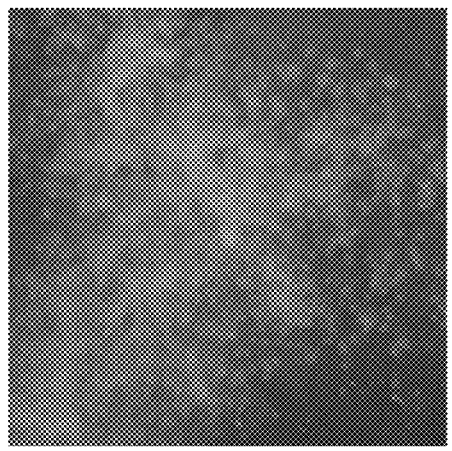
Figure 5C:
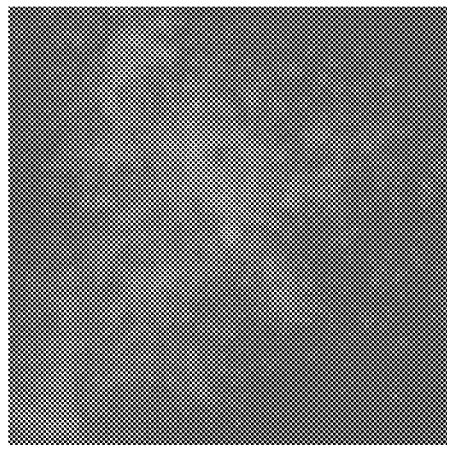

The processor 120 may calculate errors at step S330. FIGS. 5A to 5C are views illustrating an input image, a degraded image and a difference therebetween (an error).

Comparing FIG. 5A with FIG. 5B, a bright color of an image in FIG. 5B may be darker than that of an image in FIG. 5A, and a dark color of an image in FIG. 5B may be a little bit brighter than that of an image in FIG. 5A. In other words, the contrast of an image of FIG. 5B may be degraded than that of an image of FIG. 5A, and therefore, clarity may be reduced and a difference between a highest value and a lower value may be smaller.

The processor 120 may calculate the difference between images of FIG. 5A and FIG. 5B as shown in FIG. 5C, and generate the second image where a pixel value is modified by adding the difference value of FIG. 5C to the second image.

The processor 120 may determine whether an error satisfies a predetermined condition at step S340. The processor 120 may output the second image where the pixel value is modified when the error satisfies the predetermined condition at step S350.

When the error fails to satisfy the predetermined condition, the processor 120 may calculate an error again by applying a degradation model to the second image where the pixel value is modified. The processor 120 may repeat the process and output the modified second image when an error is smaller than a predetermined value or the number of repetitions is greater than a predetermined number or in both cases.

When the error fails to satisfy the predetermined condition, the processor 120 may modify a pixel value of the second image by applying the third gain to the error and apply a degradation model to the second image where the pixel value is modified to calculate an error again. In other words, the processor 120 may increase the convergence speed using the third gain.

Figure 6A:
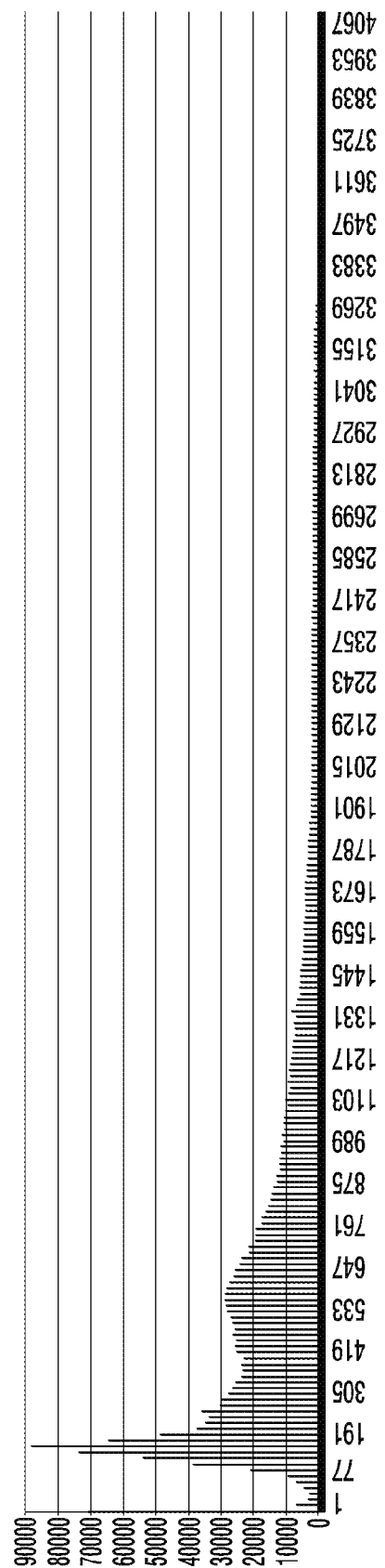
FIGS. 6A and 6B illustrate histograms of an image according to an embodiment of the present disclosure.
Figure 6B:
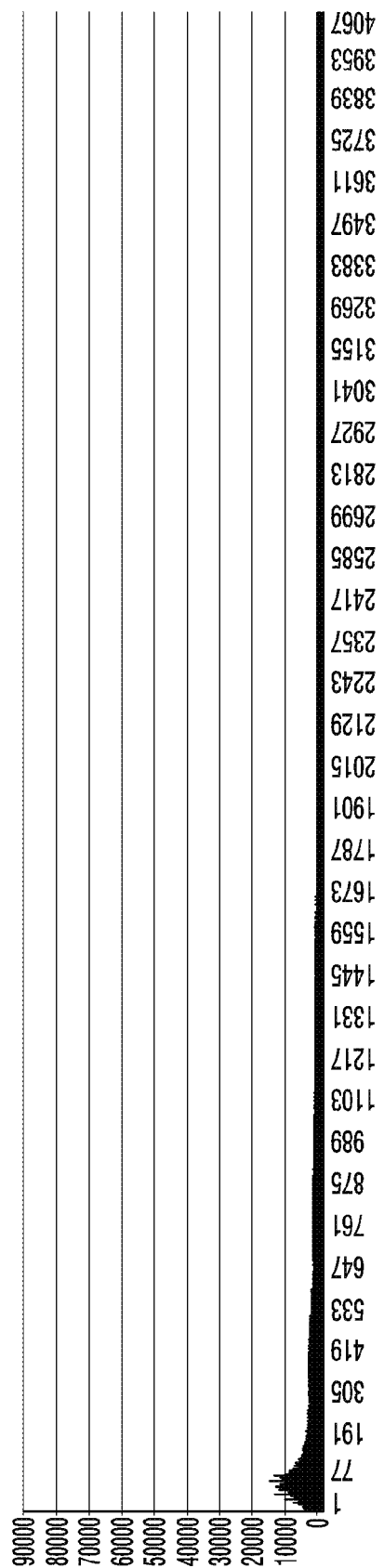

FIGS. 6A and 6B illustrate histograms of an image according to an embodiment of the present disclosure.

FIG. 6A is a histogram of an input image where the number of bits is increased, and FIG. 6B is a histogram of an image where a pixel value of the input image with the increased bit number is modified. Compared to FIG. 6A, FIG. 6B illustrates a dense histogram, which means that the contrast is expanded.

Figure 7A:
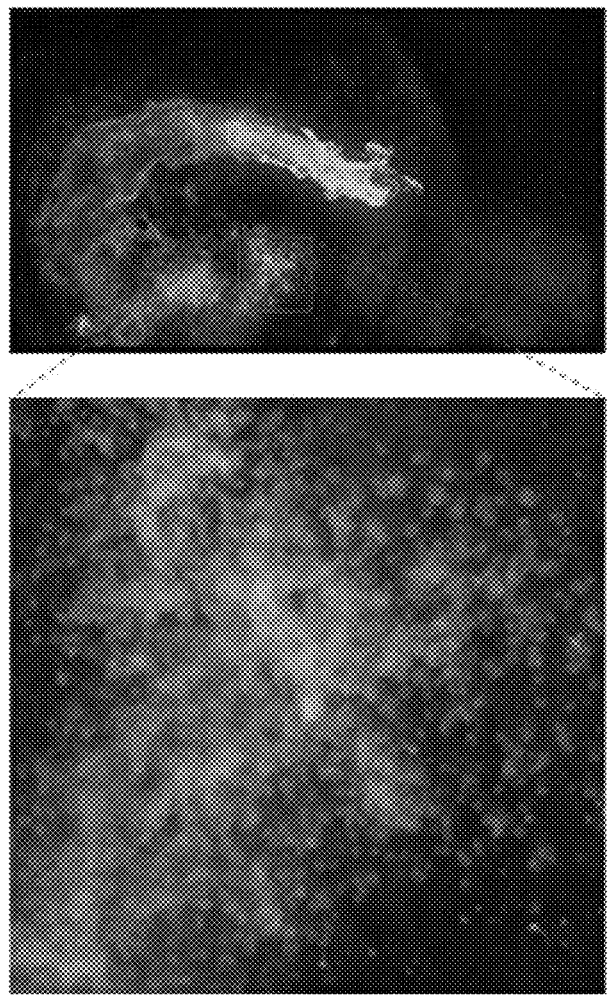
FIGS. 7A and 7B illustrate the result of an image with improved contrast according to an embodiment of the present disclosure.
Figure 7B:
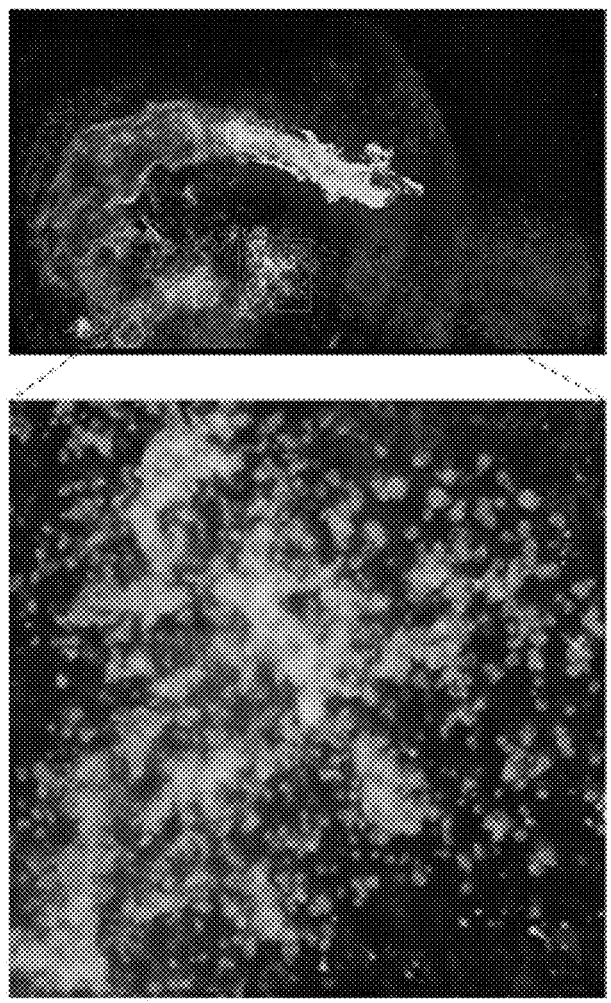

FIGS. 7A and 7B illustrate the result of an image with improved contrast according to an embodiment of the present disclosure.

FIG. 7A illustrate an input image, and FIG. 7B illustrates the result of processing an image according to the above-described method. As a result of processing an image, the contrast may increase while preventing the damage to the detail at low grayscale and high scale levels and contour occurrence.

FIG. 8 is a flowchart to explain a display method of a display apparatus according to an embodiment of the present disclosure.

A second image and a third image where a dynamic range is expanded may be generated by respectively applying a first gain and a second gain to an input first image at step S810. A degrade image of the second image may be generated by applying a predetermined degradation model to the second image at step S820. Based on a difference value between a pixel of the degraded second image and a pixel of the third image satisfying a predetermined condition, a pixel value of the second image may be modified based on the difference value at step S830. The second image where the pixel value is modified may be output at step S840.

The method may further comprises, based on the difference value not satisfying the predetermined condition, repeating the process by using the second image where the pixel value is modified as the input first image.

The predetermined condition may be at least one of the case where a difference value is smaller than a predetermined threshold value or the case where the number of repetitions of the process is greater than a predetermined threshold number or in both cases.

The repeating of the process may comprises, based on the difference value not satisfying the predetermined condition, modifying the pixel value of the second image by applying the third gain to the difference value, and using the second image where the pixel value is modified as the input first image to repeat the process.

The generating of the second image and the third image at step S810 may comprises setting a first gain and a second gain based on the number of output bits of the display apparatus and the number of bits of the input first image, and generating the second image and the third image by respectively applying the set first and second gains to the input first image.

The first gain and the second gain may be calculated based on the equation below.

$$\text{First gain} = \frac{2^k - 1}{2^n - 1}$$

$$\text{Second gain} = \frac{2^k}{2^n} = 2^{k-n}$$

Where k is the number of bits of the display apparatus and n is the number of bits of the first image.

The method may further include dividing the first image into a predetermined plurality of areas, and using each of the predetermined plurality of areas as the input first image.

The degradation model may include at least one of an Inverse Sigmoid function, a Lower Gamma function and an Upper Gamma function.

As described above, according to various embodiments of the present disclosure, an image with the minimized grayscale clustering or contour occurrence may be output although a dynamic range of an input image is expanded.

Meanwhile, the methods according to various embodiments may be programmed and stored in various storage media. Accordingly, the methods according to various embodiments described above may be implemented in various types of electronic apparatuses for executing a storage medium.

Specifically, a non-transitory computer readable medium in which a program for sequentially performing the above-described control method is stored may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. A display apparatus, comprising:
   a display; and
   a processor configured to generate a second image and a third image where a dynamic range is expanded by respectively applying a first gain and a second gain to an input first image, generate a degraded image of the second image by applying a predetermined degradation model to the second image, based on a difference value between a pixel of the degraded second image and a pixel of the third image satisfying a predetermined condition, modify a pixel value of the second image based on the difference value, and output the second image where the pixel value is modified through the display.

2. The display apparatus as claimed in claim 1, wherein the processor is further configured to, based on the difference value not satisfying the predetermined condition, repeat the process by using the second image where the pixel value is modified as the input first image.

3. The display apparatus as claimed in claim 2, wherein the predetermined condition is at least one of a case where the difference value is smaller than a predetermined threshold value, and a case where a number of repetitions of the process is equal to or greater than a predetermined threshold number.

4. The display apparatus as claimed in claim 2, wherein the processor is further configured to, based on the difference value not satisfying the predetermined condition, modify the pixel value of the second image by applying a third gain to the difference value, use the second image where the pixel value is modified as the input first image, and repeat the process.

5. The display apparatus as claimed in claim 1, wherein the processor is configured to set the first gain and the second gain based on a number of output bits of the display apparatus and a number of bits of the input first image, respectively apply the set first and second gains to the input first image, and generate the second image and the third image.

6. The display apparatus as claimed in claim 5, wherein the first gain and the second gain are calculated based on following equation, $$\text{First gain} = \frac{2^k - 1}{2^n - 1}$$

$$\text{Second gain} = \frac{2^k}{2^n} = 2^{k-n}$$

where k is a number of bits of the display apparatus, and n is a number of bits of the first image.

7. The display apparatus as claimed in claim 1, wherein the processor is further configured to divide the first image into a predetermined plurality of areas, and use each of the predetermined plurality of areas as the input first image.

8. The display apparatus as claimed in claim 1, wherein the degradation model includes at least one of an Inverse Sigmoid function, a Lower Gamma function and an Upper Gamma function.

9. A display method of a display apparatus, the method comprising:
generating a second image and a third image where a dynamic range is expanded by respectively applying a first gain and a second gain to an input first image;
generating a degraded image of the second image by applying a predetermined degradation model to the second image;
based on a difference value between a pixel of the degraded second image and a pixel of the third image satisfying a predetermined condition, modifying a pixel value of the second image based on the difference value; and
outputting the second image where the pixel value is modified.

10. The method as claimed in claim 9, further comprising:
based on the difference value not satisfying the predetermined condition, repeating the process by using the second image where the pixel value is modified as the input first image.

11. The method as claimed in claim 10, wherein the predetermined condition is at least one of a case where the difference value is smaller than a predetermined threshold value, and a case where a number of repetitions of the process is greater than a predetermined threshold number.

12. The method as claimed in claim 10, wherein the repeating of the process comprises, based on the difference value not satisfying the predetermined condition, modifying the pixel value of the second image by applying a third gain to the difference value, using the second image where the pixel value is modified as the input first image, and repeating the process.

13. The method as claimed in claim 9, wherein the generating of the second image and the third image comprises:
setting the first gain and the second gain based on a number of output bits of the display apparatus and a number of bits of the input first image; and
generating the second image and the third image by respectively applying the set first and second gains to the input first image.

14. The method as claimed in claim 13, wherein the first gain and the second gain are calculated based on following equation, $$\text{First gain} = \frac{2^k - 1}{2^n - 1}$$

$$\text{Second gain} = \frac{2^k}{2^n} = 2^{k-n}$$

where k is a number of bits of the display apparatus and n is a number of bits of the first image.

15. The method as claimed in claim 9, further comprising:
dividing the first image into a predetermined plurality of areas, and using each of the predetermined plurality of areas as the input first image.

* * * * *